March 13, 1928.
W. B. HOUSE
SCREEN FOR COTTON CLEANERS
Filed March 18, 1927
1,662,745
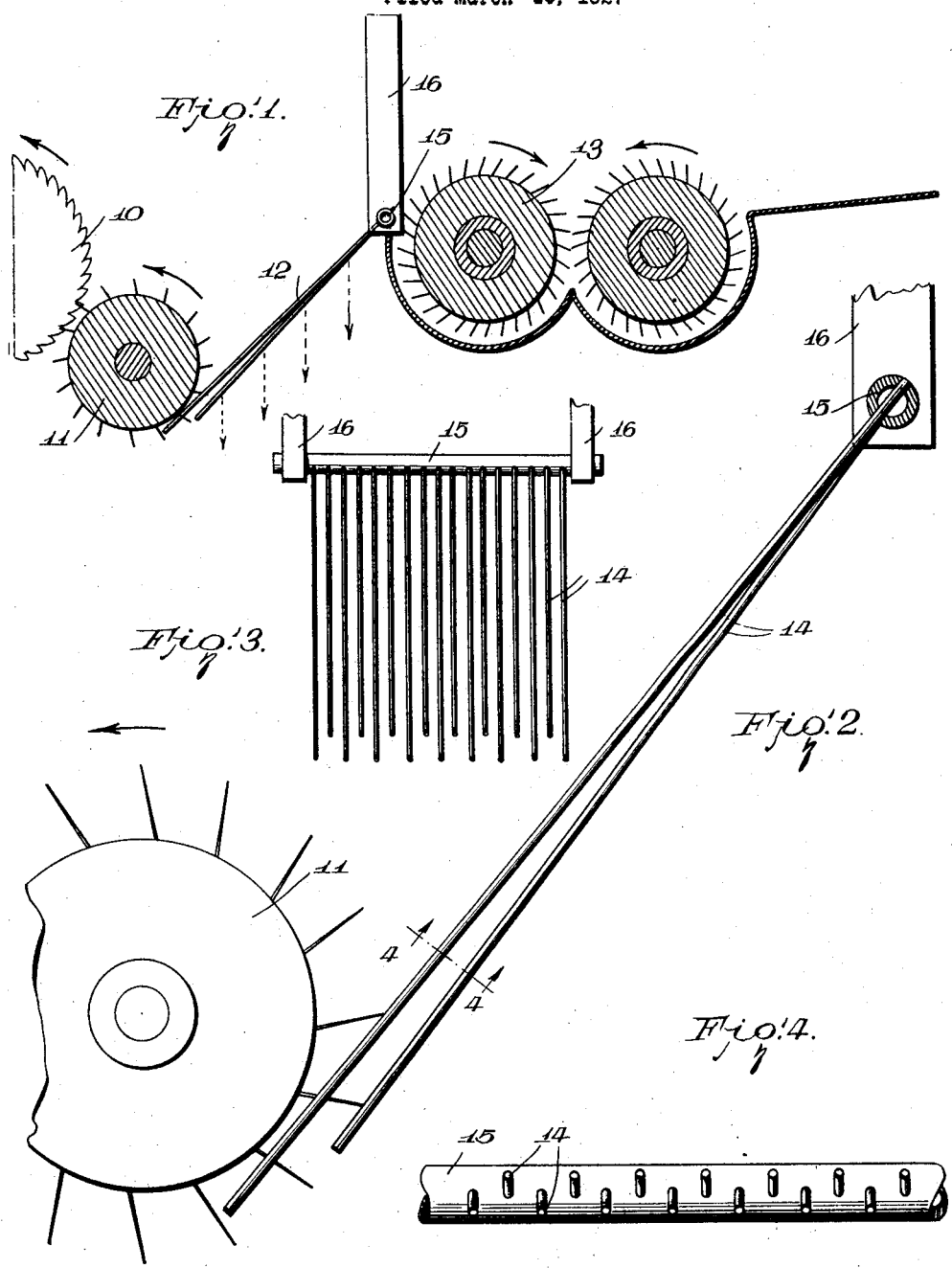

Patented Mar. 13, 1928.

1,662,745

UNITED STATES PATENT OFFICE.

WILLIAM B. HOUSE, OF ADA, OKLAHOMA.

SCREEN FOR COTTON CLEANERS.

Application filed March 18, 1927. Serial No. 176,464.

My present invention relates generally to cotton cleaners and more particularly to the screens commonly employed therein which while primarily intended for cleaners of picked cotton before ginning, are capable of use with various types of cotton cleaners without regard to condition thereof.

It is quite common to employ mesh screens in such cleaning apparatus but with indifferent success, and my invention proposes a screen or surface upon which cotton is dropped and upon which it moves by gravity, and which screen or surface is so constructed as to bring about a much more thorough cleaning of the cotton than can possibly be obtained with those now in use including mesh screens.

In the accompanying drawings, which illustrate my present invention and form a part of this specification, Figure 1 is a vertical longitudinal sectional view taken through a portion of a gin stand illustrating a practical application of my invention, Figure 2 is an enlarged vertical longitudinal section through my improved screen and certain adjacent parts, Figure 3 is a detail top plan view of my improved screen, and Figure 4 is an end view thereof.

Referring now to these figures, I have shown in Figure 1, portions of a gin stand including a gin saw 10 to which cotton is fed by a spiked roller 11. This roller takes the cotton from the lower discharge end of a screen 12 onto the upper receiving end of which the cotton is thrown by the second roller of a pair of cotton treating rollers 13 whose spikes separate the picked cotton so that when it falls upon the apron or screen 12, it is in condition to release impurities, especially large particles such as sticks, twigs, leaves, and lumps of dirt. The cotton usually moves downwardly upon the screen by gravity, sometimes assisted by air currents or pressure, and, especially with mesh screens, the openings often clog and the operation attended with but partial success.

My invention relates especially to the screen 12 and according thereto, I propose the formation of a series of longitudinal slots by means of spaced longitudinal and parallel rods 14 whose upper receiving ends are fixed in the same plane through a supporting tube 15, the latter supported between and through uprights 16 of any suitable nature.

Thus the desired slots are not only formed between the rods 14 and of an unobstructed nature from one end of the screen to the other, but the slots are open at the lower discharge end of the screen, since at this end of the screen, the rods are free of any connection with one another. Moreover the free ends of the rods 14 are alternately of different lengths, which, with the open slots, greatly facilitates the ready discharge of sticks and twigs, and permits the spiked roller 11 to more efficiently pick up the cotton for transfer to the saws 10.

It will also be observed that in their downward inclination from their upper connected ends, the rods 14 are alternately deflected into different angles which is plainly to be seen from a comparison of Figures 2 and 4, forming in effect a series of parallel longitudinal grooves in the screen surface. The slots are in this way located at opposite sides of each groove and this arrangement makes for greater efficiency in the discharge of foreign matter from the cotton and enables the screen as a whole to function effectively without danger of clogging.

I claim:

1. In a cotton cleaning apparatus, an apron for receiving the cotton, the cotton moving by gravity on said apron from the receiving end to the discharging end, said apron consisting of means forming a plurality of unobstructed slots paralleling the line of movement of the cotton, and said slots being open at the discharge end of the surface.

2. In a cotton cleaning apparatus, a screen along which the cotton moves, said screen consisting of a plurality of rods paralleling the movement of the cotton and spaced apart forming between them slots unobstructed throughout their lenghts, and said rods being supported at one end only and having their opposite free ends alternately of different lengths, as described.

3. In a cotton cleaning apparatus, an apron for receiving the cotton, the cotton moving by gravity on said apron from the receiving end to the discharging end, said screen consisting of means forming a plurality of unobstructed slots paralleling the line of movement of the cotton, and said means also arranged to form grooves, the slots being at the sides of the grooves.

4. In a cotton cleaning apparatus, a screen along which the cotton moves, said screen consisting of a plurality of rods paralleling the movement of the cotton and spaced apart forming between them slots unobstructed throughout their lengths, said rods alternately deflected into different planes and forming in effect grooves lengthwise of the screen, the slots and grooves being open at their ends adjacent to the discharge end of the screen.

5. A cleaning apron for cotton gins comprising a plurality of members disposed in spaced relation and paralleling the movement of the cotton passing thereover, and means for supporting said members in a common plane at one of their ends only, the free ends of said members being alternately of different lengths.

6. In combination with a peripherally spiked picker roll for cotton gins, an apron for delivering cotton to the roll, said apron comprising a plurality of spaced members and extending parallel to the path of movement of the cotton to said roll, and means for supporting said members at their ends removed from said roll, the free ends of said members being projected into the path of movement of and between the picker spikes of said roll.

7. In combination with a peripherally spiked picker roll for cotton gins, an apron for delivering cotton to the roll, said apron comprising a plurality of spaced members and extending parallel to the path of movement of the cotton to said roll, and means for supporting said members at their ends removed from said roll, the free ends of said members being alternately of different lengths and arranged to extend into the path of movement of and between the picker spikes of said roll.

8. In combination with a peripherally spiked picker roll for cotton gins, an apron for delivering cotton to the roll, said apron comprising a plurality of spaced members and extending parallel to the path of movement of the cotton to said roll, and means for supporting the ends of said members removed from said roll in a common plane, said members being alternately deflected into different planes away from said supporting means and having their free ends projecting into the path of and between the picker spikes of said roll.

9. In combinaton with a peripherally spiked picker roll for cotton gins, an apron for delivering cotton to the roll, said apron comprising a plurality of spaced members and extending parallel to the path of movement of the cotton to said roll, and means for supporting the ends of said members removed from said roll in a common plane, said members being alternately deflected into different planes away from said supporting means and having their free ends projecting into the path of and between the picker spikes of said roll, the free ends of said members being alternately of different lengths.

WILLIAM B. HOUSE.